July 3, 1956 D. A. WATT 2,753,476
CURRENT TRANSFER SYSTEMS
Filed Dec. 17, 1952 3 Sheets-Sheet 1

Inventor
DUDLEY ALBERT WATT,
By
Robert B. Pearson
Attorney

July 3, 1956  D. A. WATT  2,753,476
CURRENT TRANSFER SYSTEMS
Filed Dec. 17, 1952  3 Sheets-Sheet 2

Inventor
DUDLEY ALBERT WATT,
By
Robert B Pearson
Attorney

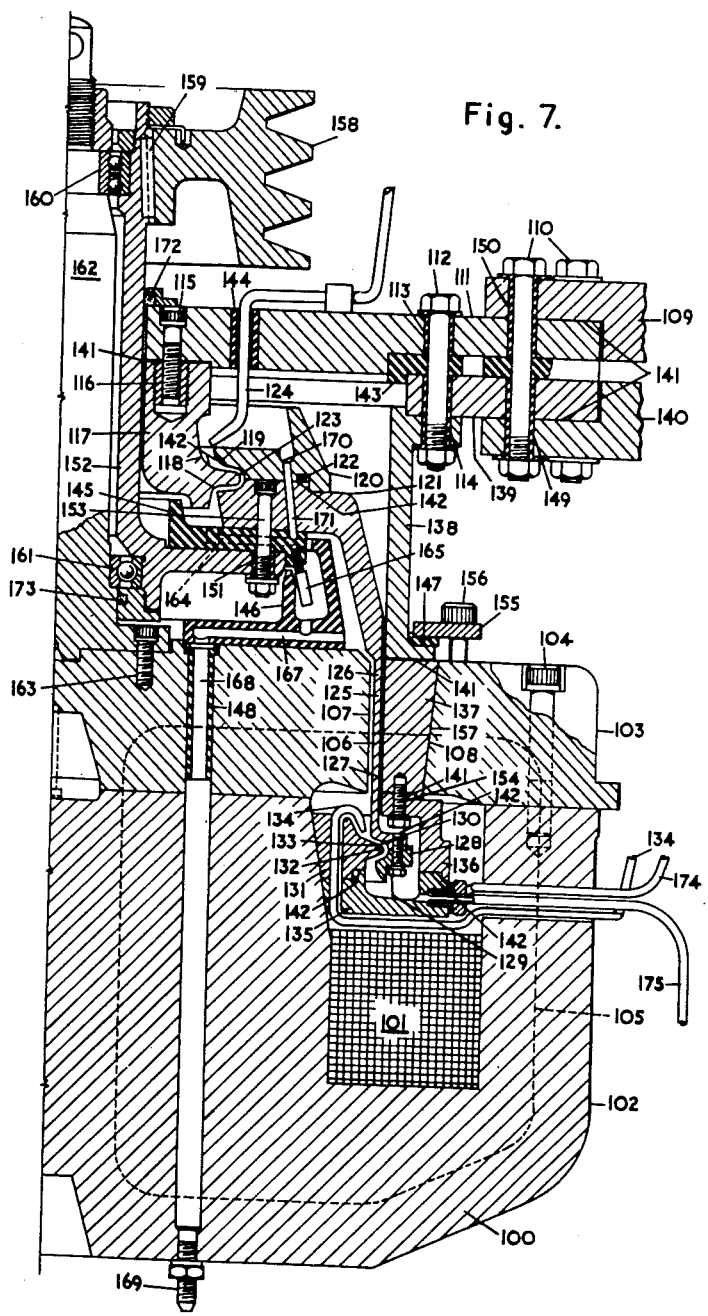

United States Patent Office 2,753,476
Patented July 3, 1956

2,753,476

CURRENT TRANSFER SYSTEMS

Dudley Albert Watt, Oxford, England

Application December 17, 1952, Serial No. 326,463

4 Claims. (Cl. 310—178)

This invention relates to current transfer systems for transferring current between a rotating member and a co-axial stationary member. The principal use of the invention is envisaged in homopolar generators (sometimes referred to as unipolar generators) for collecting the current generated in the rotor on co-axial rings or sleeves.

A homopolar generator comprises a rotor of sleeve or disc form and of high conductivity material moving in an annular gap in a magnetic circuit. Such a generator is simple in basic construction but as it possesses the characteristic of generating power at a low voltage and a high current the design of brushes for collecting the high current has presented a problem having no straightforward solution. United States Patent No. 561,803, dated June 9, 1896, shows a homopolar dynamo electric machine using a large number of solid brushes. British Patent No. 3,115, dated June 22, 1883, shows a machine using mercury as the brush material. United States Patent No. 2,588,466 shows a machine using sodium-potassium alloy as a brush material. In the last two mentioned patent specifications the liquid metal occupying the space between rotor and stator of the machine provide an unwanted current leakage path across the rotor sleeve and introduce an unnecessary friction loss. A homopolar generator using solid brush assemblies is considered to have a voltage drop of about 0.5 volt at the brushes. This represents a large power loss when the generated potential is only a few volts.

The need for high efficiency, low voltages sources exist in the electro-plating and welding industry and, more recently, for pumping liquid metals by electromagnetic interaction pumps.

As an alternative to homopolar generators, transformer and metal rectifier assemblies have been developed. Such arrangements are bulky, expensive and inefficient since the internal voltage drop is a goodly proportion of the output voltage.

The current transfer system of the invention comprises a rotor member and a co-axial stator member wherein one of said members is shaped to provide a circumferential surface concave in section and the other said member is shaped to have a peripheral portion in close proximity to said surface whereby a liquid metal can be stably supported between the two members when they are moving relative to one another to establish an electricity conducting path between said members.

The invention also consists in a homopolar generator comprising a magnet having a sleeve like annular air gap, a sleeve rotor rotatable in said air gap and a current transfer system as stated above associated with the rotor at each end therefore.

In another aspect, the invention consists in a homopolar generator comprising an electrically energised pot magnet, a rotor having a cylindrical skirt rotatable in the air gap of the magnet, fixed current collecting rings co-axial with the rotor at each end of the air gap, each ring defining with the rotor a narrow ring-shaped channel concave in section as viewed from inside the rotor, means for feeding liquid metal to the channels and means for collecting overflow liquid metal from the channels.

Also according to the invention a homopolar generator has means to provide annular liquid metal contacts between the rotor and stator current collecting rings and separate liquid metal feed systems to and from each of said current collecting rings.

It is preferable that one of the current collecting rings is attached to or constitutes the end of a cylindrical sleeve which passes back through the air gap of the magnet, that is, the rotor is located within and co-axial to this cylindrical sleeve. In this arrangement the field due to the current in the rotor is in opposition to the field due to the current in the sleeve so that the net field around the rotor and hence transverse to the main field of the generator is very small or zero and no magneto-motive force acts on the iron of the magnet in a direction perpendicular to the main field. Positive and negative terminals and bus bars are then provided at the one end of the machine. Narrow slots cut in the pole faces of the magnet parallel to the main field increase the reluctance in a direction transverse to the main field and limit the effects of stray fields in a direction transverse to the main field.

The invention may also be regarded as a liquid metal brush for a dynamo electric machine comprising an annulus of liquid metal supported on a concave surface by balanced centripetal, gravitational and electromagnetic forces.

The invention is further described with reference to the drawings wherein:

Fig. 7 is half sectional view of a homopolar generator.

Figure 1:
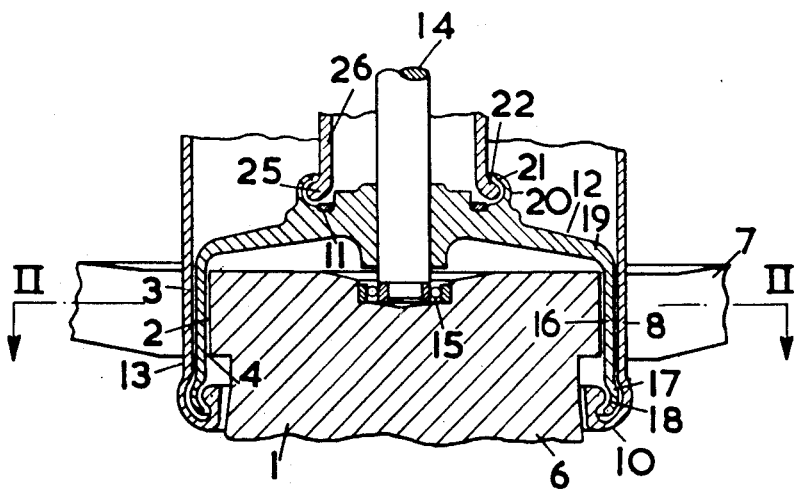
Fig. 1 is a diagrammatic cross-sectional elevation of one form of homopolar generator according to the invention. The magnet system is not shown in full in this figure.
Figure 2:
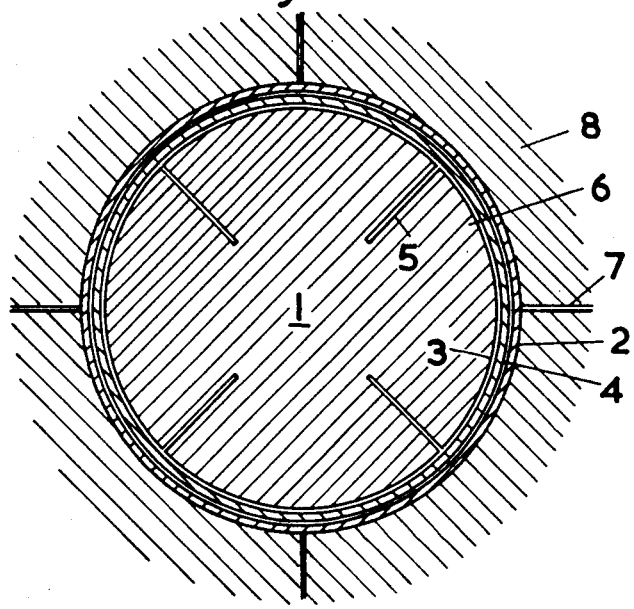
Fig. 2 is a sectional view on the line II—II of Fig. 1.

Referring to Figs. 1 and 2, a pot magnet 1 is provided with pole faces 2, 3 which define an annular air gap 4. Narrow slots 5 are provided in the core 6 and similar slots 7 are provided in pole piece 8 to limit stray fields in a direction transverse to the slots.

The rotor 12, made of rhodium-silver plated copper, is supported by a shaft 14 moving in bearings 15. The rotor comprises a skirt 16 with a curved end 17 shaped to provide a concave circumferential surface 18. At the other end or cap 19 of the rotor 12 there is a prominence 20 shaped to provide a concave circumferential surface 21. The surfaces 18 and 21 are the positive and negative ends for current generated when the rotor is moved in the magnetic field across the annular gap 4. Stationary current collecting ring assemblies are provided for current collection from the ends of the rotor; ring assembly 10 at one end and ring assembly 22 at the other end. The details of ring assembly 10 are shown in detail in Fig. 3. The assembly 10 comprises convex-section rim 23 attached to a cylindrical sleeve 24 which is bent back to form sleeve 13 which passes through the gap 4 in the pot magnet 1 (Fig. 1). Mercury is fed to the ring assembly 10 by way of pipe 9 whence it is circulated between surfaces 18 and 23 to the well 30 from where it is removed by pipe 31. The circulating system may include a cooling arrangement. The ring assembly 22 (Fig. 1) comprises a convex-section rim 25 attached to a sleeve 26. When the rotor is moving, mercury 11 is thrown up to fill the spaces between surface 21 and rim 25 so making electrical contact between the rotor and stationary sleeves 24, 26. Mercury is held in position when the rotor is moving by balance between two main forces, namely gravitational force and centripetal force. When a current is being withdrawn from the rotor electromagnetic forces are introduced due to the interaction between that current and the magnetic field of that current in the region of the mercury which tend to move the liquid metal in a direction at right angles to both the current and the field. These forces act with gravitational forces in one ring assembly and against gravitational forces in the other ring assembly. It is desirable that gravitational and electromagnetic forces at the smaller ring assembly, that is assembly 22, should be opposed to each other as the centripetal force is smaller at this brush and the electromagnetic force is greater.

The size and form of the brush assemblies are determined in part by consideration of stability of the mercury and also by friction and current carrying considerations.

The assembly 22 is made as small in radius as current density and electromagnetic force considerations allow. The smaller the assembly the lower the frictional losses since, for a given angular speed, frictional torque is proportional to the square of the radius and approximately proportional to the square of peripheral speed. The size of the rotor also governs the voltage generated for a given rotational speed. For a given value of peripheral speed, flux in the annular gap and length of rotor effectively in the gap the rotor radius is made as small as possible subject to limitations imposed by the magnetic circuit.

By providing a concave surface for the mercury differences which occur between components of gravitational and electromagnetic forces are balanced by a component of centripetal force so that the mercury is stabilised. The mercury does not lie symmetrically in the channel so long as the gravitational and electromagnetic forces are unequal. In the case of a heavy overload current being drawn through the liquid metal the mercury may be ejected from the ring assemblies by the electromagnetic forces and some arcing would then occur, the extent of arcing depending on the inductance of this circuit. It is considered that the effect of arcing may be minimised if the extremities of the surfaces 18 and 21 and the rims 23 and 25 were shaped to give a diverging mouth. This is shown in Fig. 3 where chamfers 27 and 28 are provided which at least confine any arcing to an area away from the normal contact surfaces.

Figure 4:
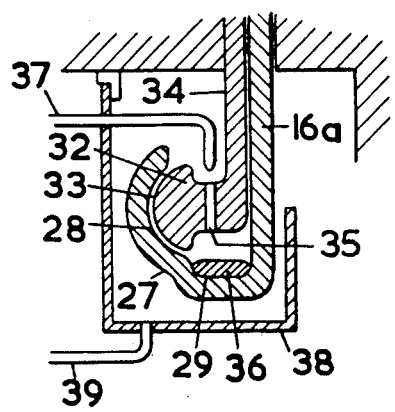
Figs. 4 and 5 are cross-sectional views showing alternative forms of brush assembly.

An alternative ring assembly is shown in Fig. 4. The rotor skirt 16a has an upturned external flange 27 providing a concave surface 28 and a well 29. The stationary current collector comprises a flange 32 having a convex surface 33. The flange 32 is carried by a sleeve 34 and holes 35 are provided through the flange. The mercury feed system for the brush comprises a pool of mercury 36 in the well 29 which is thrown up by centripetal force between surfaces 28 and 33 when the rotor is moving. Circulation of the mercury is provided by an inlet pipe 37, a collecting channel 38 and outlet pipe 39.

Figure 3:
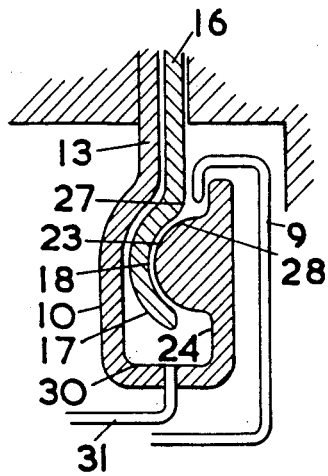
Fig. 3 is a cross-sectional view showing in detail one brush assembly used in Fig. 1.
Figure 5:
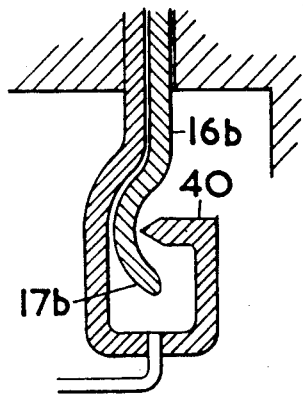

In Fig. 5 an arrangement comparable with that shown in Fig. 3 is provided. The rotor skirt 16b has a curved end 17b. The stationary collector comprises a sharp edged flange 40. Mercury feed arrangements are supplied as shown in Fig. 3.

Figure 6:
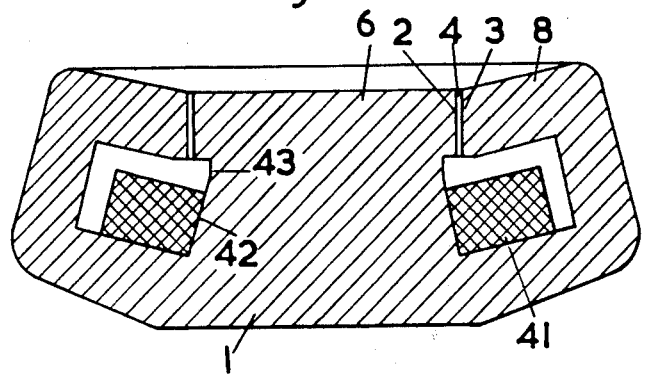
Fig. 6 shows the shaping of the magnet system.

Fig. 6 shows the shaping of the magnetic circuit. It is a pot magnet 1, having a core 6 with a winding 41. The pole faces 2, 3, the air gap 4, the pole piece 8 are also identified. The core 6 is tapered slightly at walls 42 to allow for leakage along its length and the upper end 43 of the core is of smaller radius than the air gap 4 to reduce fringing and leakage flux in the region where the ring assembly 10 operates. This reduction of fringing and leakage flux is important because of the substantial eddy currents which would otherwise circulate in the ring assembly. Certain measures may be adopted to minimise these eddy currents.

In one arrangement laminations may be provided that do not substantially impede the generated current but do impede the eddy current.

In another arrangement the resistance of the paths taken by the eddy currents may be increased by selection of the material of construction of rotor and ring assembly in the region of those paths.

In another arrangement the brush assembly is so shaped so as to produce a minimum area projected at right angles to the stray magnetic flux.

Combinations of the above arrangements may be used. As the liquid metal in the ring assembly also constitutes a part of the path for the load current it is desirable that the gap between rotor and ring assembly should be kept as narrow as other considerations, such as friction losses allow. If however the liquid metal must also be adapted to minimise eddy current losses, the gap width will also be dependent upon the quantity of liquid metal required to define the losses.

In the specific embodiments described above mercury has been referred to as the liquid metal for use as contact material between the moving surfaces of the rotor and stationary surfaces of the brush assemblies. Other liquid metals may be used, such as sodium-potassium alloy but then the machine must operate in an inert atmosphere. Metals of low specific gravity have less friction loss but mercury is preferred to sodium-potassium alloy as the corrosion problem is less and precautions need only be taken to prevent mercury vapour escaping from the machine. As mercury has a high specific gravity it provides more resistance to ejection from the brushes when overload conditions occur. Mercury is of greater resistivity than sodium-potassium alloy and in this respect it may be advantageous in reducing eddy currents at the brushes.

In Fig. 7 a pot magnet 100 consists of two parts; the base part 102 and the top ring part 103 clamped to part 102 by bolts 104. The flux path in the core is shown by the dotted line 105 and the flux is generated by the current in the coil 101. The air gap in the core is shown by annulus 106 between the pole faces 107 and 108.

The electrical circuit in the machine comprises copper bus bar 109 clamped by bolts 110 to a circular copper plate 111 which is located by bolts 112 having insulating sleeves 113 and 114. The plate 111 has depending from it, by bolts 115 in a stainless steel stud 16, a copper current collecting ring 117 which has a profile 118 over which current collection can occur. Profile 118 mates with a somewhat similar profile 119 formed in the two copper parts 120, 121 bolted together and sealed against escape of liquid metal between the parts by a ring sealing member 122. The narrow curved channel 123 between profiles 118, 119, which is concave as viewed from inside the machine, has mercury fed to it through a pipe 124 and with the machine operating the mercury is held in position by a balance between electromagnetic, gravitational and centripetal forces so that current may pass between profiles 118 and 119 to establish in effect a liquid metal brush assembly. The copper part 121 has a skirt 125 in the form of a cylindrical sleeve of 16 cms. radius which rotates in the air gap 106 and has a current induced in it by cutting the flux in the air gap when it is rotated. The end 126 of the skirt 125 is at one polarity and the end 127 is at the opposite polarity. The end 127 together with a part 128 clamped thereto by bolts 129 has a profile 130. A current collecting copper ring 131 has a profile 132 which forms a narrow channel 133 with profile 130. A pipe 134 feeds mercury into channel 133 to establish a second liquid metal brush assembly. The current collected in ring 130 passes by way of plate 135, ring 136, low carbon steel sleeve 137, copper sleeve 138, copper ring 139 to copper bus bar 140. The electrical circuit of the machine may be summarised as consisting of copper cylindrical sleeve 125 where the E. M. F. of the machine is generated and a connection from end 126 of the sleeve to bus bar 109 via liquid metal brush in channel 123, and a connection from end 127 of the sleeve to bus bar 140 via liquid metal brush in channel 133 and steel conductor 137 passing back through the annular gap in the magnet. Some minor features of construction of the electrical circuit are given as follows. The heavy lined surfaces 141 are silver plated and the heavy lined surfaces 142 are silver and rhodium plated. Insulators 143 to 151 are provided. The part 121 is mounted on a stainless steel tubular shaft 152 by way of insulators 145 and bolts 153 so that it can be rotated. Part 137 is bolted to ring 136 by bolts 154. The sleeve 138 is clamped to part 137 by clamping ring 155 through insulator 147 by bolts 156. The face 157 of part 137 has a coating of thermosetting plastic.

The mechanical drive to the rotor of the machine, comprising parts identified by numerals 152, 145, 153, 121, 120, 125, 128 and 129, is via a pulley 158 keyed at 159 to the hollow stainless steel shaft 152 mounted on bearings 160 and 161 on stainless steel pillar 162 bolted to the magnet 100 with bolts 163.

The mercury circulation system for the brush in channel 123 is by way of pipe 124, channel 123 duct 164, pipe 165, duct 167, and pipe 168 to discharge connection 169. A splash groove collector 170 is provided connected by duct 171 to the duct 164. Sealing against escape of mercury in liquid or vapour form is provided by felt washers 172, 173. The mercury circulation system for the brush in channel 133 consists of inlet pipe 134 and 174 and outlet pipe 175. Owing to the greater heat generated at the brush in channel 133 a double supply of mercury is considered desirable.

I claim:

1. A homopolar generator comprising an electrically energized pot magnet, a rotor sleeve rotatable on a vertical axis in the air gap having end rings outside the air gap shaped to provide ring-shaped surfaces curved in section, stator members having convex surfaces matching with said concave surfaces to form narrow ring-shaped channels of curved section, means for feeding liquid metal to pass across said channels, and electrical connections from said stator members to terminal members, one only of said electrical connection being adapted to pass back through the air gap in the potmagnet.

2. A homopolar generator as claimed in claim 1 wherein said electrical connection passing back through the air gap comprises a sleeve of magnetic material having an electrical conductivity superior to that of the magnetic material of the pot magnet, and magnetic properties at least equal to those of the pot magnet, said sleeve being shaped to fit in the air gap to be traversed by the flux in the pot magnet.

3. A liquid metal brush for a dynamo electric machine comprising an annulus of liquid metal supported on a ring-shaped surface of concave section by balanced centripetal, gravitational and electromagnetic forces wherein said surface is bounded by two lips of different radii, and means provided for continuously feeding liquid metal from an external source to the smaller radius lip and for collecting the overflow from the larger radius lip.

4. A homopolar generator comprising a magnet having a sleeve-like annular air gap, a sleeve-like rotor rotatable on a vertical axis in said air gap, and a current transfer system at each end of said sleeve-like rotor; each of said current transfer systems comprising a liquid metal supported between said magnet and rotor members, one of said members being shaped to provide a circumferential surface of concave section and the other of said members being shaped to have a peripheral portion in close proximity to said surface, so that when liquid metal is stably supported between said members due to a balance between electromagnetic, gravitational and centripetal forces when said members are moving relative to one another, an electrical conducting path is formed therebetween; feed means for circulating liquid metal separately through each of said current transfer systems whereby said liquid metal can be processed for reuse.

References Cited in the file of this patent

UNITED STATES PATENTS

| | | |
|---|---|---|
| 523,998 | Rennerfelt | Aug. 7, 1894 |
| 1,507,825 | Gill et al. | Sept. 9, 1924 |
| 1,635,319 | Gill et al. | July 12, 1927 |
| 2,401,166 | Kobel | May 28, 1946 |
| 2,588,466 | Barnes | Mar. 11, 1952 |

FOREIGN PATENTS

| | | |
|---|---|---|
| 17,108 | Great Britain | of 1890 |
| 423,442 | France | Feb. 16, 1911 |